US011292209B2

(12) United States Patent
Solenthaler

(10) Patent No.: US 11,292,209 B2
(45) Date of Patent: Apr. 5, 2022

(54) ULTRASONIC PROCESSING SYSTEM, BOOSTER AND METHOD

(71) Applicant: TELSONIC HOLDING AG, Bronschhofen (CH)

(72) Inventor: Peter Solenthaler, St. Margarethen (CH)

(73) Assignee: Telsonic Holding AG, Bronschhofen (CH)

( * ) Notice: Subject to any disclaimer, the term of this patent is extended or adjusted under 35 U.S.C. 154(b) by 154 days.

(21) Appl. No.: 16/471,871

(22) PCT Filed: Feb. 13, 2017

(86) PCT No.: PCT/EP2017/053117
§ 371 (c)(1),
(2) Date: Jun. 20, 2019

(87) PCT Pub. No.: WO2018/145769
PCT Pub. Date: Aug. 16, 2018

(65) Prior Publication Data
US 2020/0086586 A1    Mar. 19, 2020

(51) Int. Cl.
*B29C 65/00* (2006.01)
*B23K 1/06* (2006.01)
(Continued)

(52) U.S. Cl.
CPC ............ *B29C 66/0342* (2013.01); *B23K 1/06* (2013.01); *B23K 20/106* (2013.01); *B29C 65/08* (2013.01);
(Continued)

(58) Field of Classification Search
CPC ..... B29C 66/0342; B29C 65/08; B29C 66/21; B29C 66/3494; B29C 66/81429;
(Continued)

(56) References Cited

U.S. PATENT DOCUMENTS 3,529,660 A     9/1970  Obeda
2003/0066863 A1  4/2003  Skogsmo et al.
(Continued)

FOREIGN PATENT DOCUMENTS

DE      42 06 584 A1    9/1993
DE      101 51 992 A1   5/2003
(Continued)

OTHER PUBLICATIONS

Woerner, "Dispelling Two Common Myths about Vortex Tubes", Process Cooling Magazine, Apr. 2014, https://www.process-cooling.com/articles/88099-dispelling-two-common-myths-about-vortex-tubes. (Year: 2014).*

(Continued)

*Primary Examiner* — Michael N Orlando
*Assistant Examiner* — Christopher W Raimund
(74) *Attorney, Agent, or Firm* — Finch & Maloney PLLC; Michael J. Bujold; Jay S. Franklin

(57) ABSTRACT

An ultrasonic processing system (1) which comprises an ultrasonic vibrator (10) having an ultrasonic sonotrode (30) and a working surface (31) for ultrasonic processing of a workpiece. The vibrator (10) comprises a longitudinal axis (L), an enclosed cavity (32, 51) extends along the longitudinal axis at least in the sonotrode (30), a medium inlet (52) through which a cooling medium is fed into the cavity (32, 51), at least one vortex generator (53) which arranged between the medium inlet (52) and the cavity (32, 51) such that a swirl motion of the medium is generated inside the cavity (32, 51) around the longitudinal axis. A cooling channel (34) is fluidly connected to the enclosed cavity (32, 51) to guide the medium in the vicinity of the working surface (31) such that the working surface (31) is cooled. A first medium outlet (33) is fluidly connected to the cooling channel (34).

18 Claims, 6 Drawing Sheets

Figure 1:
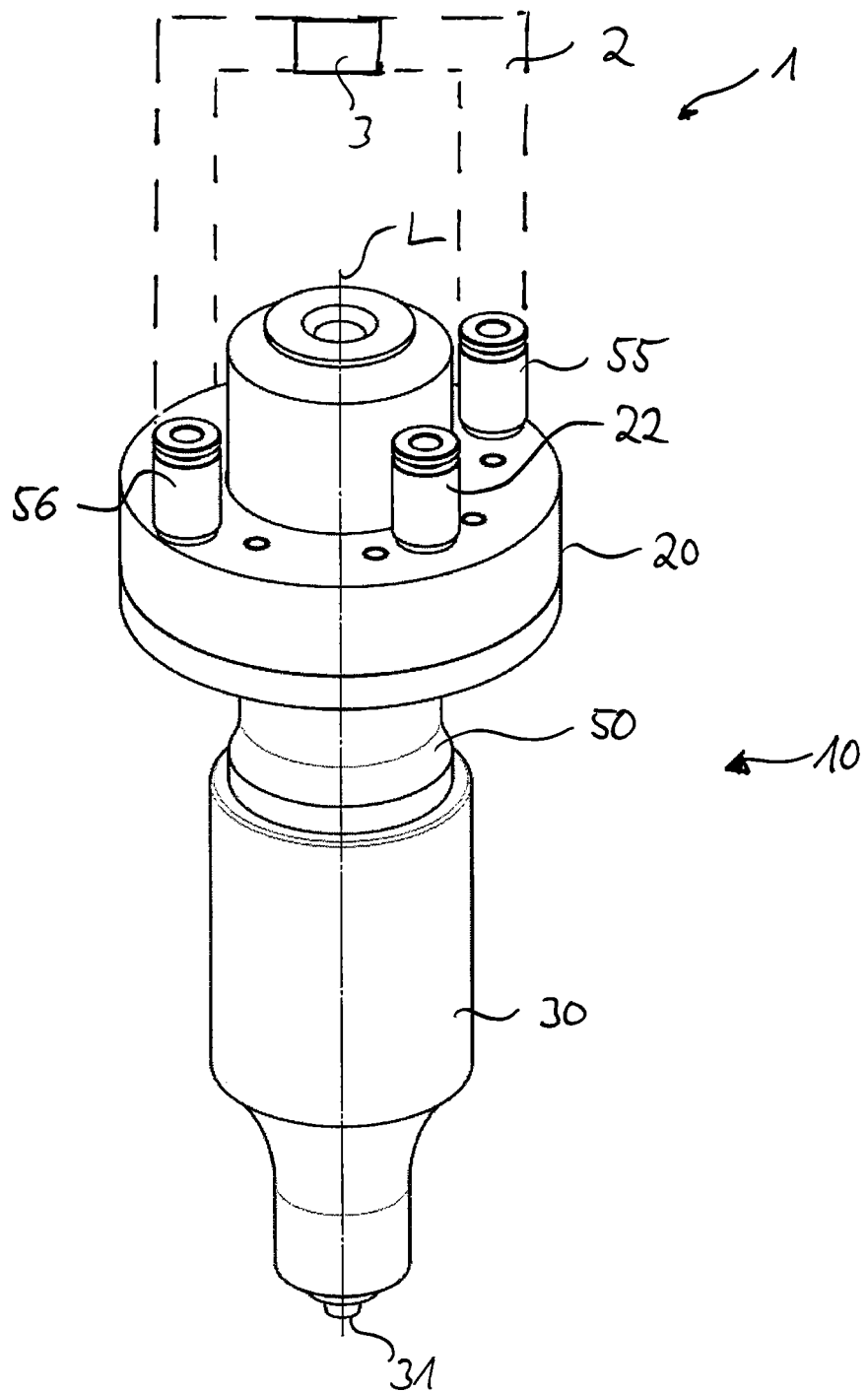

(51) Int. Cl.
　　*B23K 20/10*　　(2006.01)
　　*B29C 65/08*　　(2006.01)
　　*B23K 103/00*　　(2006.01)

(52) U.S. Cl.
　　CPC .......... *B29C 66/21* (2013.01); *B29C 66/3494* (2013.01); *B23K 2103/42* (2018.08)

(58) Field of Classification Search
　　CPC ........ B29C 66/81431; B29C 66/81423; B29C 66/919; B29C 66/91941; B29C 66/8322; B29C 66/816; B29C 66/929; B29C 66/8167; B29C 66/81811; B23K 1/06; B23K 20/106; B23K 2103/42; B06B 2201/72
　　See application file for complete search history.

(56) References Cited

U.S. PATENT DOCUMENTS

2007/0172559 A1* 7/2007 Capodieci .............. A21C 11/16
　　　　　　　　　　　　　　　　　　　　　426/238
2010/0147466 A1* 6/2010 Sans Marimon ...........................
　　　　　　　　　　　　　　　　　　　　　B29C 66/81811
　　　　　　　　　　　　　　　　　　　　　156/580.2
2015/0034229 A1　2/2015　Ochs
2018/0185956 A1　7/2018　Solenthaler et al.

FOREIGN PATENT DOCUMENTS

| DE | 102 50 741 A1 | 5/2004 |
| DE | 20 2008 007 271 U1 | 9/2008 |
| DE | 20 2008 008 426 U1 | 12/2008 |
| DE | 10 2008 029 769 A1 | 12/2009 |
| DE | 10 2013 215 106 A1 | 2/2015 |
| EP | 2 133 191 A2 | 12/2009 |
| EP | 2 832 456 A2 | 2/2015 |
| ES | 1 163 609 U | 8/2016 |
| GB | 2 000 470 A | 1/1979 |
| WO | 2017/001255 A2 | 1/2017 |

OTHER PUBLICATIONS

International Search Report Corresponding to PCT/EP2017/053117 dated Oct. 24, 2017.
Written Opinion Corresponding to PCT/EP2017/053117 dated Oct. 24, 2017.

* cited by examiner

ULTRASONIC PROCESSING SYSTEM, BOOSTER AND METHOD

The present invention relates to ultrasonic processing of workpieces, for example ultrasonic connecting of workpieces such as welding and/or brazing of workpieces, ultrasonic cleaning of workpieces or ultrasonic cutting of workpieces.

Known systems for ultrasonic processing of workpieces comprise an ultrasonic sonotrode with at least one working surface for ultrasonic processing of the workpieces. The process of ultrasonic plastic welding applies temperatures of about 200 to 250° C. to a working surface of a sonotrode. After the welding has been completed, it is important to allow the welded workpieces to cool down below the glass temperature of the plastic material in order keep their shapes. Therefore, a welding force has to be applied until the glass temperature has been reached which usually takes several seconds. In order to speed up this process, it is necessary to have a cooling device which cools down the sonotrode and its working surface to dissipate the thermal heat stored due to the sonotrode thermal capacity. Several approaches have been made in the prior art in order to provide such a cooling.

For example, DE 42 06 584 A1 discloses a system for connecting two workpieces by ultrasound in which a working surface of a sonotrode is cooled by cooling air emitted by one or several nozzles arranged around the working surface. However, such a cooling of only the outside of the sonotrode is not very effective.

According to US 2003/0066863 A1, a cooling medium is externally blown across the sonotrode or it may travel through various passageways located within the sonotrode. A further embodiment in US 2003/0066863 A1 utilizes the use of cooling fins connected to the sonotrode to cool the sonotrode to a lower temperature.

DE 102 50 741 A1, DE 101 51 992 A1, DE 20 2008 007 271 U1, DE 10 2008 029 769 A1, EP 2 832 456 A2 and WO 2017/001255 A2 teach further sonotrodes having internal channels through which a heating or cooling medium such as a liquid can be guided.

The sonotrode disclosed in ES 1 163 609 U contains a central bore connected to slanted channels opening out near a working surface of the sonotrode. A cooling medium can be guided through this system of bores and channels.

While these concepts known from the prior art allow an accelerated dissipation of the heat generated during ultrasonic processing, there is still a need for an even more effective dissipation and cooling. This is one of the key factors for achieving cycle times as short as possible which is of particular importance in serial processing of mass articles. In addition, the use of liquid cooling media requires a closed liquid circuit which significantly impedes the replacement of one sonotrode by another one. Moreover, cavitation often occurs in liquid media exposed to ultrasound which can also lead to difficulties.

It is thus an object of the present invention to provide systems and methods which allow an even more effective dissipation of the heat generated during ultrasonic processing and thus a more efficient cooling. In some embodiments, the sonotrode should be replaceable by another sonotrode more easily.

These and further objects are achieved, in a first aspect of the invention, by an ultrasonic processing system comprising an ultrasonic vibrator having an ultrasonic sonotrode with at least one working surface for ultrasonic processing of at least one workpiece. As explained above, ultrasonic processing may be ultrasonic connecting of workpieces such as welding and/or brazing of workpieces, ultrasonic cleaning of workpieces or ultrasonic cutting of workpieces. The vibrator comprises

- a longitudinal axis,
- an enclosed cavity extending along the longitudinal axis at least in the sonotrode,
- at least one medium inlet through which a cooling medium, in particular a cooling gas, can be fed into the cavity,
- at least one vortex generator which is designed and arranged between the medium inlet and the cavity such that a swirl motion of the medium inside the cavity around the longitudinal axis can be generated,
- at least one cooling channel fluidly connected to the enclosed cavity and guiding the medium through the vicinity of the working surface such that the working surface is cooled by the cooling medium, as well as
- at least one first medium outlet fluidly connected to the cooling channel.

In use, the cooling medium is fed into the medium inlet, passes the vortex generator and flows through the enclosed cavity. At least a first portion of the cooling medium having flown through the enclosed cavity then flows through the cooling channel and is finally discharged through the first medium outlet.

Thus, in contrast to the systems known from the prior art, the system according to the present invention contains at least one vortex generator which is designed and arranged between the medium inlet and the cavity such that a swirl motion of the medium inside the cavity around the longitudinal axis can be generated. As could be shown by the inventor, a much faster heat dissipation and thereby cooling of the sonotrode and in particular its working surface is obtained when such a swirl motion of the cooling medium can be generated inside the cavity. This results in a dramatic reduction of cycle times which is of significant importance, for example in the serial production of workpieces. In some experiments, a reduction of cycle times from about 3 seconds to less than 1 second could be demonstrated.

Without restricting the present invention, it is currently assumed that the Joule-Thomson effect known as such at least partially reduces the temperature of the cooling medium as it passes the vortex generator and thereby contributes to the improved heat dissipation of the present invention. When a cooling due to the Joule-Thomson effect occurs in the vicinity of an adjacent ultrasonic converter connected to the vibrator for exciting vibrations of the ultrasonic vibrator, such a converter may also be cooled.

Also without restricting the present invention, it is currently assumed that the vortex generator and the enclosed cavity in the ultrasonic vibrator and in particular its sonotrode function as a vortex tube. Vortex tubes as such are known and attributed to Georges J. Ranque and Rudolf Hilsch. It is also currently assumed that a first portion of the cooling medium flowing in the radially inner area of the enclosed cavity has a reduced compared to the incoming cooling medium whereas a second portion of the cooling medium flowing in a radially outer area of the enclosed cavity has an increased temperature compared to the incoming cooling medium. Furthermore, the first cooled portion of the cooling medium in the radially inner area is currently assumed to be thermally shielded off from the heated vibrator by the second portion of the cooling medium in the radially outer area. Thus, preferably, the cooling channel is fluidly connected to the enclosed cavity in such a way that at least a portion of the cooling medium having flown through a radially inner area of the enclosed cavity is guided through the vicinity of the working surface.

For the avoidance of possible doubts, the term "enclosed cavity" as used in the description of the present invention does not denote a hermetically closed cavity but a cavity which is enclosed by interior walls with the exception of medium inlets and medium outlets.

The vibrator may further comprise a booster which is connected to the sonotrode and which contains the medium inlet and the vortex generator, wherein the enclosed cavity extends in both the sonotrode and the booster. The cavity is thus enclosed by both the sonotrode and the booster. Therefore, in those embodiments in which the vibrator contains a booster, at least a part of its length may also be used to define the vortex tube and thus to provide a cooling effect.

With particular preference, the sonotrode is releasably connectable or connected to the booster. This allows the replacement of one sonotrode by another one, for example when one sonotrode has to undergo service or when another sonotrode having different properties is required for the specific ultrasonic processing. For example, the sonotrode may be releasably connectable or connected to the booster by screw connecting means, which greatly simplifies the replacement of one sonotrode by another one.

Preferably, the medium inlet is formed as a radial channel which allows a simple manufacture but is nevertheless effective.

Also with preference, the vibrator, in particular the booster, contains at least one passage which extends substantially parallel to the longitudinal axis and fluidly connects the medium inlet with the vortex generator. The cooling medium is thus axially guided to the vortex generator.

Preferably, the vortex generator contains at least one, preferably a plurality of guiding surfaces which are designed and arranged for deflecting the cooling medium having entered through the medium inlet into a swirl motion inside the cavity around the longitudinal axis.

In one embodiment, the vortex generator is formed by a screw and interior walls delimiting the enclosed cavity of the vibrator, in particular interior walls delimiting a portion of the cavity extending in the booster, wherein a shaft portion of the screw is held in a first cylindrical section of the enclosed cavity having a first diameter $d_1$, a passage is formed between an unthreaded part of the shaft portion and the interior walls which extends substantially parallel to the longitudinal axis, a head portion of the screw is arranged in a second cylindrical section of the enclosed cavity having a second diameter $d_2$ which is larger than the first diameter $d_1$ and the head portion contains, on its side facing the shaft portion, at least one of the guiding surfaces. This construction is particularly simple but effective. A threaded part of the shaft portion facing away from the head portion and the unthreaded part may sealingly engage with the first cylindrical section.

With further preference, the transition from the first cylindrical section to the second cylindrical section is located in the vicinity of a longitudinal vibrational node of the vibrator, in particular the booster, during intended operation. This impedes an unfavorable conversion of vibrational energy to heat energy.

Advantageously, the system further comprises a feeding flange for feeding the cooling medium into the medium inlet, wherein the feeding flange at least partially surrounds the vibrator. This allows a simple but effective feeding-in of the cooling medium. In addition, the feeding flange may simultaneously hold the ultrasonic vibrator, in particular the booster. The flange may surround the vibrator in a plane perpendicular to the longitudinal axis of the system.

The feeding flange favorably comprise an inlet channel for the cooling medium and a first ring channel at least partially surrounding the longitudinal axis of the vibrator and fluidly connecting the inlet channel with the medium inlet of the vibrator. Such a ring channel allows feeding several medium inlets of the vibrator. The inlet channel may be arranged substantially parallel to the longitudinal axis of the vibrator.

With particular preference, the feeding flange is connected to and holds the vibrator in the area of a longitudinal vibrational node of the vibrator, in particular the booster, during intended operation. This impedes an unfavorable conversion of vibrational energy to heat energy.

The feeding flange may further comprise at least one cooling channel through which a second cooling medium can be guided. This has the effect of an additional cooling of the vibrator in the area of the feeding flange and optionally also of an ultrasonic converter which is connected to the vibrator for exciting vibrations of the ultrasonic vibrator. The cooling channel may be formed as a second ring channel at least partially surrounding the longitudinal axis of the vibrator. Thereby, a uniform cooling of the vibrator in the vicinity of the feeding flange can be obtained.

With further preference, the feeding flange further comprises at least one second inlet channel through which the second cooling medium can be fed into the cooling channel and at least one second outlet channel through which the second cooling medium can be discharged from the cooling channel, and the system further comprises an outer cooling section fluidly connecting the second outlet channel with the second inlet channel and containing an outer cooling unit for cooling the second cooling medium in the outer cooling section. Therefore, a closed cooling circuit is obtained for the second cooling medium. In particular, the cooling channel of the feeding flange is not fluidly connected to the enclosed cavity. Therefore, a liquid may be used as a second cooling medium. Preferred liquids are water and methanol. The outer cooling unit may comprise at least one Peltier element known as such and/or at least one external vortex cooler also known as such and/or a cooler employing evaporation and/or compression also known as such.

With particular preference, the enclosed cavity, in particular a portion of the cavity extending in the sonotrode, contains a first cylindrical section which is directed towards the vortex generator, extends along the longitudinal axis and has a first diameter $D_1$ and a second cylindrical section adjacent to the first cylindrical section which is directed away from the vortex generator, extends along the longitudinal axis and has a second diameter $D_2$. The second diameter $D_2$ is favorably smaller than the first diameter $D_1$, wherein in particular $D_2 < D_1/2$.

Advantageously, the first medium outlet is arranged in the vicinity of the working surface. Thus, the cooling medium is discharged from the vibrator in the vicinity of the working surface. This construction is particularly simple and provides a superior cooling of the working surface.

With further advantage, the first medium outlet is arranged in a portion of the outer surface of the sonotrode which is arranged at an angle with respect to the longitudinal axis, wherein the angle is preferably in the range from 60° to 80°.

With further preference, the cooling channel extends at an angle with respect to the longitudinal axis of the vibrator. Thus, the cooling medium is also discharged at said angle. This has the additional effect that the ultrasonically processed workpiece can be blown off from the working surface by the aid of the discharged cooling medium. Preferably, said angle is less than 60°, and even more preferably, it is in the range from 7° to 15°.

The vibrator, in particular the sonotrode, may further comprise at least one second medium outlet which is fluidly connected to the enclosed cavity in such a way that at least a portion of the cooling medium having flown through a radially outer area of the enclosed cavity is guided to the second medium outlet, wherein the second medium outlet is further removed from the working surface than the first medium outlet. A second portion of the cooling medium having flown in this radially outer area of the enclosed cavity, which is currently believed to have a higher temperature than a second portion of the cooling medium having flown in a radially inner area of the enclosed cavity, can then be discharged through the second medium outlet. This further contributes to the cooling of the working surface. However, as was found by the inventor, an improved cooling effect can also be obtained when no second medium outlets are present and the entire cooling medium having flown through the enclosed cavity is discharged through first medium outlets.

When a second medium outlet is present, it may be arranged in a circumferential surface of the vibrator, in particular in a circumferential surface of the sonotrode.

The second medium outlet is preferably located in the vicinity of a longitudinal vibrational node of the vibrator, in particular the sonotrode, during intended operation. This impedes an unfavorable conversion of vibrational energy to heat energy.

A second aspect of the present invention relates to an ultrasonic booster which may be used in an ultrasonic processing system as disclosed above. The booster comprises
  a longitudinal axis,
  a cavity extending in the booster,
  connecting means, in particular screw connecting means, for connecting the booster with an ultrasonic sonotrode having a cavity in such a way that the cavity of the booster and the cavity of the sonotrode form an enclosed cavity of the connected booster and sonotrode,
  at least one medium inlet through which a cooling medium can be fed into the cavity of the booster,
  at least one vortex generator which is designed and arranged between the medium inlet and the enclosed cavity such that a swirl motion of the medium inside the enclosed cavity around the longitudinal axis can be generated.

When used in connection a sonotrode as explained, the advantages described above may be achieved.

Similar to the above disclosure,
  the booster may contain at least one passage which extends substantially parallel to the longitudinal axis and fluidly connects the medium inlet with the vortex generator;
  and/or
  the vortex generator of the booster may contain at least one, preferably a plurality of guiding surfaces which are designed and arranged for deflecting the cooling medium having entered through the medium inlet into a swirl motion inside the cavity around the longitudinal axis;
  and/or
  the vortex generator of the booster may be formed by a screw and interior walls delimiting the cavity, wherein
  a shaft portion of the screw is held in a first cylindrical section of the cavity having a first diameter $d_1$,
  a passage is formed between an unthreaded part of the shaft portion and the interior walls which extends substantially parallel to the longitudinal axis,
  a head portion of the screw is arranged in a second cylindrical section of the cavity having a second diameter $d_2$ which is larger than the first diameter $d_1$ and
  the head portion contains, on its side facing the shaft portion, at least one of the guiding surfaces;
  and/or
  the transition from the first cylindrical section to the second cylindrical section may be located in the vicinity of a longitudinal vibrational node of the booster during intended operation.

These features have the advantages explained already above in connection with the ultrasonic processing system.

A third independent aspect of the invention relates to an ultrasonic booster, in particular an ultrasonic booster as disclosed above. The booster comprises
  a longitudinal axis,
  a first connection end at which the booster is connectable to an ultrasonic converter,
  a second connection end opposed to the first connection end with respect to the longitudinal axis, wherein the booster is connectable to an ultrasonic sonotrode at the second connection end by connecting means, in particular screw connecting means.

According to the third aspect of the invention, the booster comprises a cavity having a cross-section perpendicular to the longitudinal axis which increases at least in a portion along the longitudinal axis from the first connection end to the second connection end. Thus, in contrast to previously known ultrasonic boosters in which the outer perimeter, in particular the outer diameter, decreases along the longitudinal axis, the inner perimeter, in particular the inner diameter, of the present booster increases along the longitudinal axis. Both a decrease of the outer perimeter and an increase of the inner perimeter result in a reduction of the cross-sectional area along the longitudinal axis and thus in an amplification of the ultrasound. However, an at least partially hollow booster whose inner perimeter increases along the longitudinal axis leads to a much higher stability of the booster against bending forces acting during ultrasonic processing.

In one embodiment which can be easily manufactured, the cavity contains a first cylindrical section which is directed towards the first connection end, extends along the longitudinal axis and has a first diameter $d_1$ and a second cylindrical section adjacent to the first cylindrical section which is directed to the second connection end, extends along the longitudinal axis and has a second diameter $d_2$ which is larger than the first diameter $d_1$.

With preference, the transition from the first cylindrical section to the second cylindrical section is located in the vicinity of a longitudinal vibrational node of the booster during intended operation, which impedes an unfavorable conversion of vibrational energy to heat energy.

A fourth aspect of the invention relates to a method of ultrasonically processing of a least one workpiece by using an ultrasonic processing system as disclosed above. The method comprises the steps of
  ultrasonically processing the workpiece by the working surface of the sonotrode,
  feeding a cooling medium through the medium inlet into the enclosed cavity, thereby generating a swirl motion of the medium inside the enclosed cavity around the longitudinal axis and cooling the working surface by the medium flowing out of the first medium outlet.

In the most general scope of the invention, these steps may be performed several times in succession (in particular on several workpieces) and/or alternately and/or at least partially simultaneously. With preference, however, the method comprises the steps of
- a) ultrasonically processing a first workpiece by the working surface (31) of the sonotrode (30),
- b) feeding a cooling medium through the medium inlet into the enclosed cavity, thereby generating a swirl motion of the medium inside the enclosed cavity around the longitudinal axis and cooling the working surface by the medium flowing out of the first medium outlet,
- c) ultrasonically processing a second workpiece by the working surface of the sonotrode,
- d) optionally repeating steps b) and c) one or several times.

The cooling medium may be a gas. The gas may be a pure gas or a gas comprising a small amount of liquid. However, it is preferred that the cooling medium is a pure gas as this allows an easier handling. In particular, a spilling of liquid is avoided, most notably during replacement of the sonotrode. In addition, cavitation which occurs in many liquids can be avoided by using a gas.

The cooling gas may be air, which is easily and cheaply available. Other suitable cooling gases are carbon dioxide, nitrogen and noble gases. Noble gases are particularly preferred when oxidation needs to be prevented in the ultrasonic processing of certain materials, in particular ultrasonic welding of certain metals. Of course, any mixtures of these gases may be used as cooling gas.

In order to achieve a large temperature difference of the cooling medium before and after it passes the vortex generator, it is advantageous when the cooling medium is fed into the medium inlet at a pressure of at least 2 bar, preferably at least 4 bar, more preferably at least than 6 bar. As could be shown, a sufficient cooling effect can be achieved when the cooling medium is fed into the medium inlet at a pressure of at most 20 bar or even at most 10 bar.

In order to obtain low temperatures at the working surface of the sonotrode, it is also preferable when the cooling medium is fed into the medium inlet at a low temperature. However, when the temperature at which the cooling medium is fed into the medium inlet is at least 15° C., condensation can be advantageously prevented.

In preferred embodiments, the workpiece that is ultrasonically processed is made of plastic and processed by ultrasonic welding and/or brazing, in particular ultrasonic spot welding and/or brazing.

Favorably, when the system comprises a feeding flange comprising at least one cooling channel as discloses above, a cooling liquid is guided through the cooling channel as a second cooling medium. This provides an additional cooling to the vibrator and optionally also of an ultrasonic converter connected to the vibrator.

Figure 2:
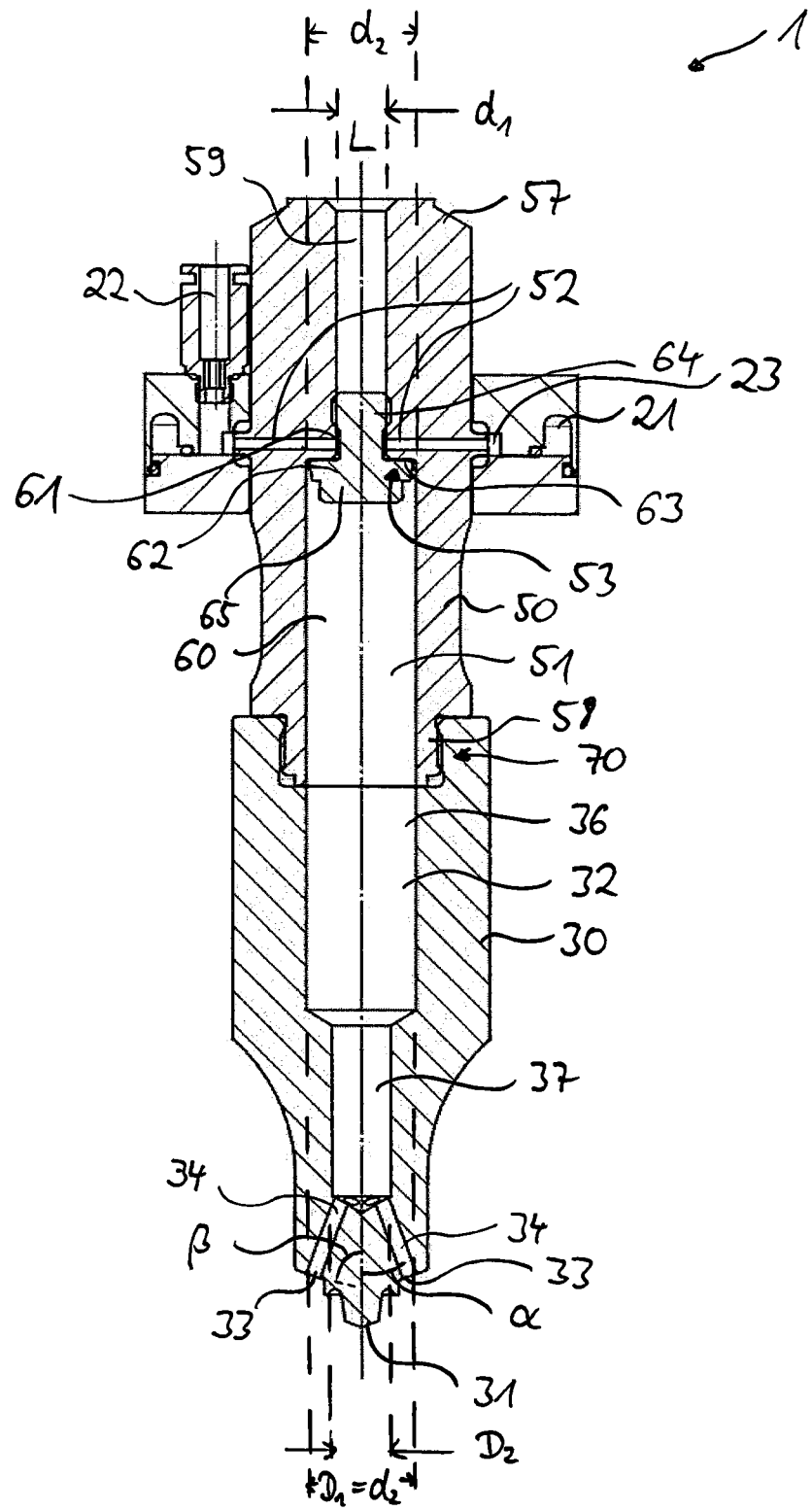
Figure 3:
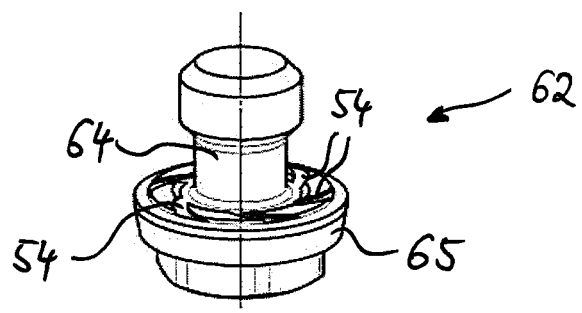
Figure 4:
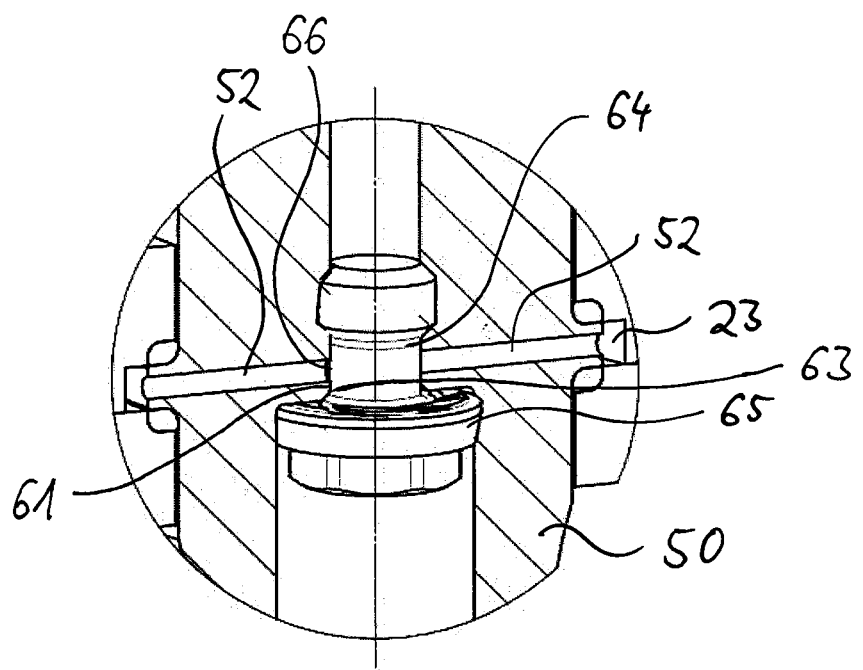
Figure 5:
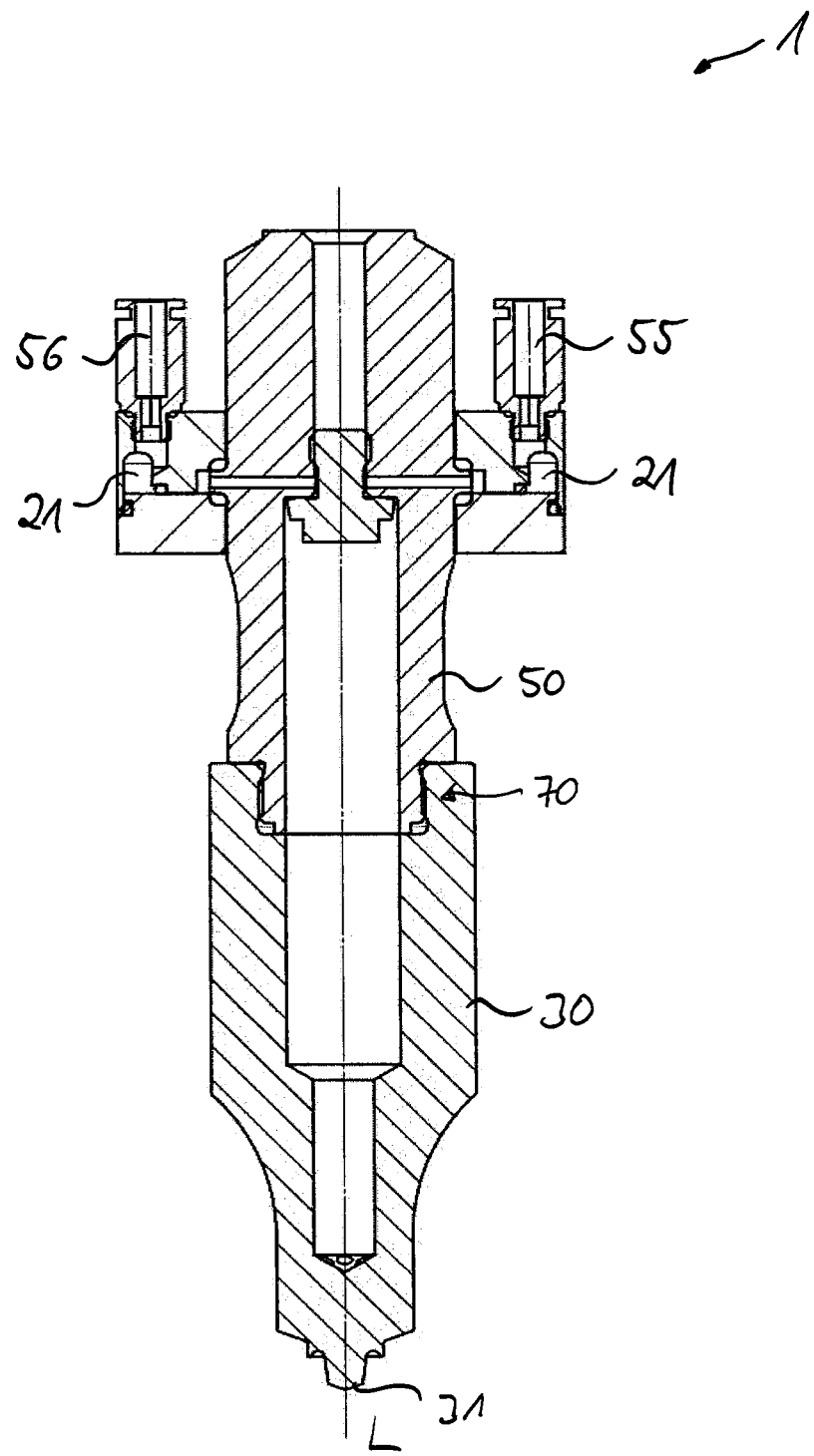
Figure 6:
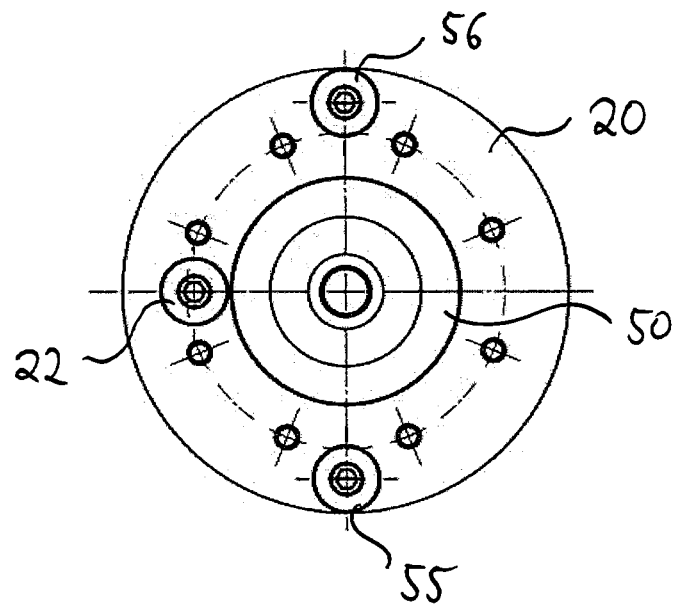
Figure 7:
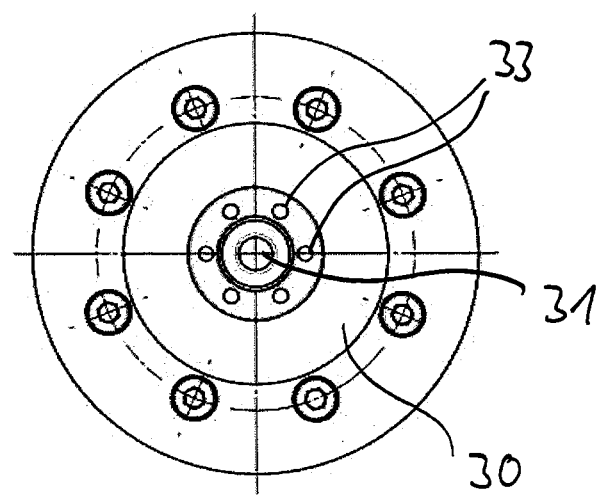
Figure 8:
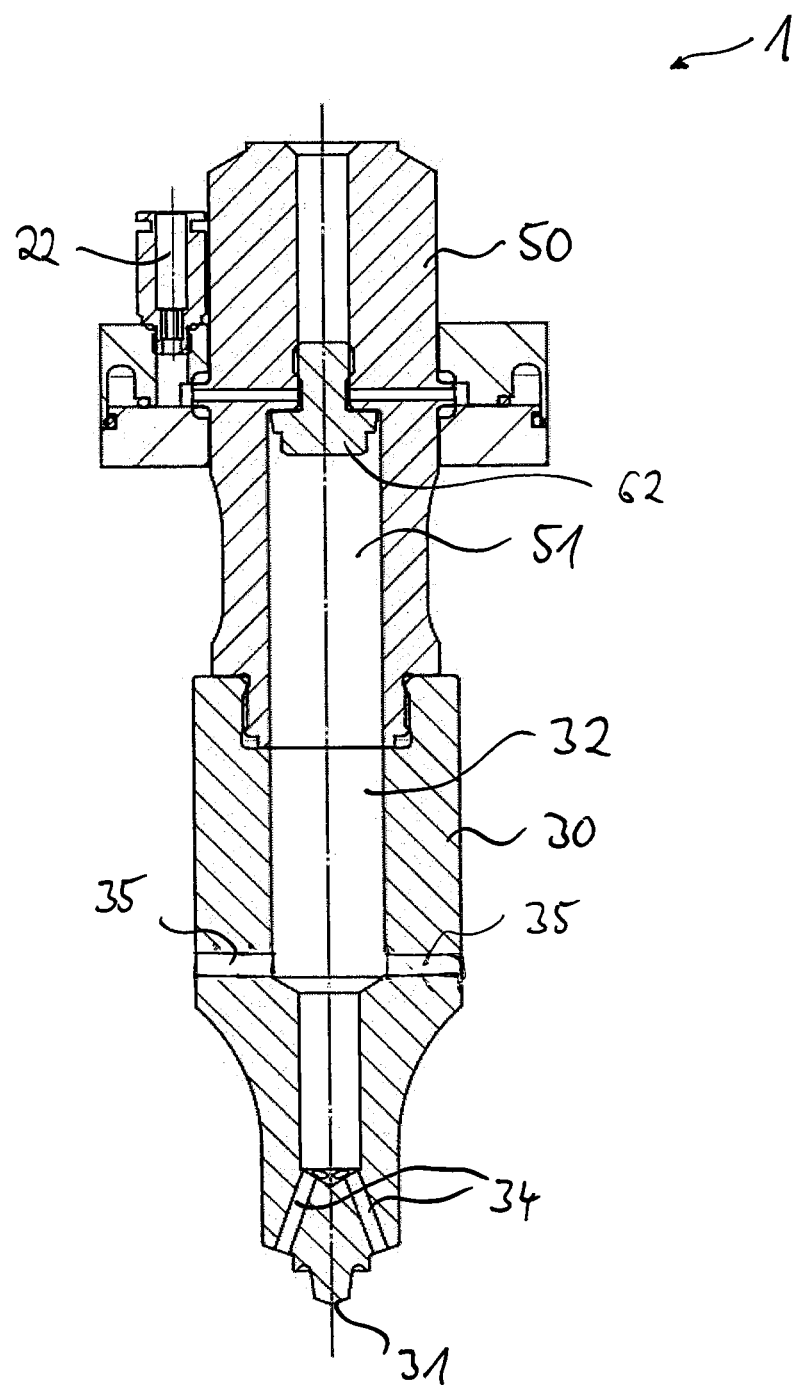

The invention is now further explained with the aid of an exemplary embodiment shown in the drawings, wherein FIG. 1 shows a first ultrasonic processing system according to the invention in a perspective view, FIG. 2 shows the first ultrasonic processing system in a first sectional side view, FIG. 3 shows a vortex generator of the first ultrasonic processing system in a perspective view, FIG. 4 shows the first ultrasonic processing system in a sectional perspective view, FIG. 5 shows the first ultrasonic processing system in a second sectional side view, FIG. 6 shows the first ultrasonic processing system in a view from above, FIG. 7 shows the first ultrasonic processing system in a view from below, FIG. 8 shows a second ultrasonic processing system according to the invention in a sectional side view.

The first embodiment of an ultrasonic processing system 1 shown in FIGS. 1 through 7 contains an ultrasonic vibrator 10 comprising an ultrasonic sonotrode 30 and an ultrasonic booster 50 extending along a longitudinal axis L. At its end directed away from the booster 50, the sonotrode has a working surface 31 for processing workpieces, for example for ultrasonic welding.

A feeding flange 20 surrounds the booster 50 in a plane perpendicular to the longitudinal axis L and holds it in the area of a longitudinal vibrational node during intended operation. The feeding flange 20 comprises an inlet channel 22 for a first, gaseous cooling medium. The inlet channel 22 is arranged parallel to the longitudinal axis L. The feeding flange 20 further comprises a second inlet channel 55 through which a second, liquid cooling medium can be fed and a second outlet channel 56 through which the second cooling medium can be discharged. As schematically shown in FIG. 1, the system 1 also comprises an outer cooling section 2 fluidly connecting the second outlet channel 56 with the second inlet channel 55 and an outer cooling unit 3 for cooling the second cooling medium in the outer cooling section 2. The cooling unit 3 may be a Peltier cooling unit.

As can be seen in FIG. 2, the vibrator 10 comprises an enclosed cavity 32, 51 extending along the longitudinal axis L in both the booster 50 and the sonotrode 30. The feeding flange 20 contains a first, inner ring channel 23 which surrounds the longitudinal axis L and fluidly connects the inlet channel 22 with medium inlets 52 which are formed as radial channels 52 in the booster 50. Through these medium inlets 51, a gaseous cooling medium such as air can be fed into the cavity 32, 51. The air can be fed in at a pressure between 6 bar and 10 bar and at a temperature of slightly above 15° C.

The portion of the cavity 51 which extends in the booster 50 contains a first cylindrical section 59 which is directed towards a first connection end 57 of the booster 50 which may be connected to an ultrasonic converter which is not shown in FIG. 2. The first section 59 extends along the longitudinal axis L and has a first diameter $d_1$. The portion of the cavity 51 extending in the booster 50 also contains a second cylindrical section 60 adjacent to the first cylindrical section 59 which is directed to a second connection end 58 of the booster 50. At the second connection end 58, the booster 50 is releasably connected to the sonotrode 30 by a screw connection 70. The second cylindrical section 60 also extends along the longitudinal axis L and has a second diameter $d_2$ which is larger than the first diameter $d_1$. Thus, the cavity 51 has a cross-section perpendicular to the longitudinal axis L which increases along the longitudinal axis L from the first connection end 57 to the second connection end 58. Thus, the outer perimeter of the booster 50 can be left almost constant along its length, thereby reducing bending induced by forces that may occur during operation of the system.

The transition from the first cylindrical section 59 to the second cylindrical section 60 is located in the vicinity of a longitudinal vibrational node of the booster 50 during intended operation. The feeding flange 20 is also located at this transition.

The system 1 further comprises a vortex generator 53 which is formed by a screw 62 and interior walls 63 delimiting a portion of the cavity 32 extending in the booster 50. A shaft portion 64 of the screw 62 is held in the first cylindrical section 59 of the cavity 51. A passage 61 is formed between an unthreaded part 66 of the shaft portion 64 and the interior walls 63. A threaded part of the shaft portion 64 facing away from a head portion 65 and the unthreaded part 66 sealingly engages with the first cylindrical section 59. The passage 61 extends parallel to the longitudinal axis L. The head portion 65 of the screw 62 is arranged in the second cylindrical section 60 of the cavity 51.

As can be seen better in FIG. 3, the head portion 65 contains, on its side facing the shaft portion 65 and thus the first cylindrical section 59, several guiding surfaces 54. In use, these guiding surfaces 54 deflect the cooling gas having entered through the medium inlets 52 and passed the passageway 61 into a swirl motion inside the cavity 32, 51 around the longitudinal axis L.

Turning now to FIG. 5, the feeding flange 20 further comprises a cooling channel 21 through which a second cooling medium, preferably a cooling liquid such as water or methanol, can be guided. The cooling channel 21 is formed as a second, outer ring channel 21 which surrounds the longitudinal axis L and also the inner channel 23. A closed circuit is formed in which the cooling liquid enters through the second inlet channel 55, is guided through the ring channel 21, leaves through the second outlet channel 56 and is then cooled again in the outer cooling section 2 shown in FIG. 1. The cooling liquid flowing through the ring channel 21 cools the booster 50 and optionally an ultrasonic converter which is, however, not shown.

Returning to FIG. 2, the sonotrode 30 also contains a portion 32 of the enclosed cavity 32, 51. This portion 32 contains a first cylindrical section 36 which is directed towards the vortex generator 53, extends along the longitudinal axis L and has a first diameter $D_1$ and a second cylindrical section 37 adjacent to the first cylindrical section 36 which is directed away from the vortex generator 53, extends along the longitudinal axis L and has a second diameter $D_2$ which is smaller than the first diameter $D_1$. With preference, $D_2 < D_1/2$. In the embodiment shown in the drawings, the diameter $d_2$ of section 60 of the booster cavity 51 is equal to the diameter $D_1$ of section 37 of the sonotrode cavity 32.

The vibrator 10 further contains six cooling channels 34 connected to the cavity 32. The cooling channels 34 end in first medium outlets 33 which are arranged in the vicinity of and around the working surface 31. The cooling channels 34 extend at an angle α of approximately 15° with respect to the longitudinal axis L. The first medium outlets 33 are arranged in a portion of the outer surface of the sonotrode 30 which is arranged at an angle β of approximately 75° with respect to the longitudinal axis L.

In use, a gaseous cooling medium, such as air, is fed into the inlet channel 22 and is then guided through the ring channel 23, the medium inlets and the passage 51 and is then directed to the guiding surfaces 54 of the vortex generator 53. This causes a swirl motion of the cooling medium around the axis L. A first portion of the cooling medium having flown through the radially inner area of the enclosed cavity 32, 51 and also a second portion of the cooling medium having flown through the radially outer area of the enclosed cavity 32, 51 then flows through the cooling channels 34 and are finally discharged through the first medium outlets 33.

In the second embodiment depicted in FIG. 8, the sonotrode 30 additionally contains second medium outlets 35 connected to the enclosed cavity 32, 51 in such a way that at least a portion of the cooling medium having flown through a radially outer area of the enclosed cavity 32, 51 is guided to the second medium outlets 35. The second medium outlets 35 are arranged in a circumferential surface of the sonotrode 30, in the vicinity of a longitudinal vibrational node of the sonotrode 30 during intended operation. Directing this portion of the cooling gas away from the working surface 31 further enhances the cooling effect.

The invention claimed is:

1. An ultrasonic processing system comprising:
an ultrasonic vibrator having an ultrasonic sonotrode with at least one working surface for ultrasonic processing at least one workpiece,
wherein the vibrator comprises:
a longitudinal axis,
an enclosed cavity extending along the longitudinal axis at least in the sonotrode,
at least one medium inlet through which a cooling medium can be fed into the cavity,
at least one vortex generator which is designed and arranged between the medium inlet and the cavity such that a swirl motion of the medium inside the cavity around the longitudinal axis can be generated,
at least one cooling channel fluidly connected to the cavity and guiding the medium through the vicinity of the working surface such that the working surface is cooled by the cooling medium, and
at least one first medium outlet fluidly connected to the cooling channel,
wherein the vortex generator contains at least one guiding surface which is designed and arranged for deflecting the cooling medium which entered through the medium inlet in a swirl motion inside the cavity around the longitudinal axis,
wherein the vortex generator comprises a shaft and interior walls delimiting the cavity of the vibrator, wherein
the shaft comprises a shaft portion and a head portion, and the shaft is held in a first cylindrical section of the cavity having a first diameter,
a passage is formed between the shaft portion of the shaft and the interior walls, and the passage extends substantially parallel to the longitudinal axis,
the head portion is arranged in a second cylindrical section of the cavity having a second diameter which is larger than the first diameter, and
the head portion contains, on a side facing the shaft portion, at least one of the guiding surfaces.

2. The system according to claim 1, wherein the vibrator further comprises a booster which is connected to the sonotrode and which contains the medium inlet and the vortex generator, and the cavity extends in both the sonotrode and the booster.

3. The system according to claim 1, wherein the vortex generator is formed by a screw and the interior walls, wherein
said shaft portion is a shaft portion of the screw,
said passage is formed between an unthreaded part of the shaft portion and the interior walls,
said head portion is a head portion of the screw.

4. The system according to claim 3, wherein, during intended operation, a transition from the first cylindrical section to the second cylindrical section is located in the vicinity of a longitudinal vibrational node of the vibrator.

5. The system according to claim 1, wherein:
the first cylindrical section is directed towards the vortex generator and extends along the longitudinal axis, and
the second cylindrical section is adjacent to the first cylindrical section, is directed away from the vortex generator, and extends along the longitudinal axis and has a second diameter which is smaller than the first diameter.

6. The system according to claim 1, wherein the first medium outlet is arranged in the vicinity of the working surface.

7. The system according to claim 6, wherein the first medium outlet is arranged in a portion of the outer surface of the sonotrode which is arranged at an angle with respect to the longitudinal axis.

8. The system according to claim 7, wherein the cooling channel extends at an angle with respect to the longitudinal axis.

9. The system according to claim 1, wherein the vibrator further comprises at least one second medium outlet which is fluidly connected to the cavity in such a way that at least a portion of the cooling medium, having flowed through a radially outer area of the cavity, is guided to the second medium outlet, and the second medium outlet is further removed from the working surface than the first medium outlet.

10. An ultrasonic booster comprising:
a longitudinal axis,
a cavity extending in the booster,
connecting means for connecting the booster with an ultrasonic sonotrode having a cavity in such a way that the cavity of the booster and the cavity of the sonotrode form an enclosed cavity of the connected booster and sonotrode,
at least one medium inlet through which a cooling medium can be fed into the cavity of the booster, and
at least one vortex generator which is designed and arranged between the medium inlet and the cavity such that a swirl motion of the medium can be generated inside the cavity around the longitudinal axis,
wherein the vortex generator contains at least one guiding surface which is designed and arranged for deflecting the cooling medium having entered through the medium inlet into a swirl motion inside the cavity around the longitudinal axis,
wherein the vortex generator comprises a shaft and interior walls delimiting the cavity of the vibrator, wherein
the shaft comprises a shaft portion and a head portion, and the shaft is held in a first cylindrical section of the cavity having a first diameter,
a passage is formed between the shaft portion of the shaft and the interior walls, and the passage extends substantially parallel to the longitudinal axis,
the head portion is arranged in a second cylindrical section of the cavity having a second diameter which is larger than the first diameter, and
the head portion contains, on a side facing the shaft portion, at least one of the guiding surfaces.

11. The booster according to claim 10, wherein the vortex generator is formed by a screw and interior walls delimiting the cavity,
a shaft portion of the screw is held in a first cylindrical section of the cavity having a first diameter,
a passage is formed between an unthreaded part of the shaft portion and the interior walls which extends substantially parallel to the longitudinal axis,
a head portion of the screw is arranged in a second cylindrical section of the cavity having a second diameter which is larger than the first diameter, and
the head portion contains, on a side facing the shaft portion, at least one of the guiding surfaces.

12. The booster according to claim 11, wherein the transition from the first cylindrical section to the second cylindrical section is located in the vicinity of a longitudinal vibrational node of the booster during intended operation.

13. The booster according to claim 10, further comprising:
a first connection end at which the booster is connectable to an ultrasonic converter,
a second connection end opposed to the first connection end with respect to the longitudinal axis,
wherein the booster is connectable to the sonotrode at the second connection end by the connecting means, and
the cavity has a cross-section perpendicular to the longitudinal axis which increases at least in a portion along the longitudinal axis from the first connection end to the second connection end,
wherein the connecting means are arranged on the outside of the booster.

14. The booster according to claim 13, wherein
the first cylindrical section is directed towards the first connection end and extends along the longitudinal axis, and
the second cylindrical section is adjacent to the first cylindrical section, is directed to the second connection end, and extends along the longitudinal axis.

15. The booster according to claim 14, wherein, during intended operation, the transition from the first cylindrical section to the second cylindrical section is located in a vicinity of a longitudinal vibrational node of the booster.

16. A method of ultrasonically processing of a least one workpiece by using an ultrasonic processing system according to claim 1, the method comprising the steps of:
ultrasonically processing the workpiece by the working surface of the sonotrode, and
feeding a cooling medium through the medium inlet into the cavity, thereby generating a swirl motion of the medium inside the cavity around the longitudinal axis and cooling the working surface by the medium flowing out of the medium outlet.

17. The method according to claim 16 of ultrasonically processing a plurality of workpieces, comprising the steps of:
a) ultrasonically processing a first workpiece by the working surface of the sonotrode,
b) feeding a cooling medium through the medium inlet into the cavity, thereby generating a swirl motion of the medium inside the cavity around the longitudinal axis and cooling the working surface by the medium flowing out of the medium outlet, and
c) ultrasonically processing a second workpiece by the working surface of the sonotrode.

18. The method according to claim 17, wherein the cooling medium is a gas.

* * * * *